United States Patent [19]

Janowicz

[11] Patent Number: 4,694,054
[45] Date of Patent: Sep. 15, 1987

[54] COBALT(II) CHELATES AS CHAIN TRANSFER AGENTS IN FREE RADICAL POLYMERIZATIONS

[75] Inventor: Andrew H. Janowicz, Wilmington, Del.

[73] Assignee: E. I. Du Pont de Nemours and Company, Wilmington, Del.

[21] Appl. No.: 821,321

[22] Filed: Jan. 27, 1986

Related U.S. Application Data

[63] Continuation-in-part of Ser. No. 707,367, Mar. 1, 1985, abandoned.

[51] Int. Cl.$^4$ .............................................. C08F 2/40
[52] U.S. Cl. ..................................... 526/93; 526/120; 526/123; 526/131; 526/134; 526/135; 526/147; 526/317.1; 526/319; 526/287; 526/329.7; 526/340.2; 526/341
[58] Field of Search ............... 526/120, 131, 135, 146, 526/147, 93, 123, 134

[56] References Cited

U.S. PATENT DOCUMENTS

| 3,594,453 | 7/1971 | Cusano | 526/911 |
| 3,644,307 | 2/1972 | Biale | 526/911 |
| 3,814,740 | 6/1974 | Miller | 526/911 |
| 4,526,945 | 7/1985 | Carlson et al. | 526/145 |

OTHER PUBLICATIONS

Smirnov et al., Dokl. Akad. Nauk SSSR, 255, 609-612 (1980).
Cacioli et al., J. Macromol., A23, 839-852 (1986).
Abbey et al., Proceedings of the ACS Division of Polymeric Materials Science and Engineering, 55, 235-238 (1986).
Cacioli et al., Polymer Bulletin, 11, 325-328 (1984).
B. R. Smirnov et al., Vysokomol. Soyed., A23, No. 11, 2588 (1981) Reprinted in Polymer Science, U.S.S.R., vol. 23, No. 11, 2807 (1981).
D. E. Pashchenko et al., Dokl. Akad. Nauk SSSR, 265, 889 (1982).
A. F. Burczyk et al., J. Polym. Sci., Polym. Chem. Ed., vol. 22, 3255 (1984).
A. F. Burcyzk, Thesis to the University of Waterloo, Waterloo, Ontario (1984).
H. C. Rai et al., Indian Journal of Chemistry, vol. 18A, 242 (1979).
E. Uhlig et al., Z. Anorg. Allg. Chem., 343, 299 (1966).
G. N. Schrauzer, Inorg. Syn., 11, 62, 64 (1968).
A. Bakac et al., J. Am. Chem. Soc., 106, 5197 (1984).
N. S. Enikolopyan et al., J. Polym. Sci., Polym. Chem. Ed., vol. 19, 879 (1981).
B. R. Smirnov et al., in Vysokomol. Soyed., A23, No. 5, 1042 (1981), Reprinted in Polymer Science U.S.S.R., vol. 23, No. 5, 1158 (1981).
B. R. Smirnov et al., in Dokl. Akad. Nauk SSSR, 253, 891 (1980).

Primary Examiner—Edward J. Smith
Attorney, Agent, or Firm—Suzanne E. Miller

[57] ABSTRACT

Free radical polymerization processes employing cobalt(II) chelates of vicinal iminohydroxyimino compounds, dihydroxyimino compounds, diazadihydroxyiminodialkyldecadienes and diazadihydroxyiminodialkylundecadienes as catalytic chain transfer agents for controlling the molecular weight of the homopolymers and copolymers produced.

59 Claims, No Drawings

COBALT(II) CHELATES AS CHAIN TRANSFER AGENTS IN FREE RADICAL POLYMERIZATIONS

RELATED APPLICATION

This application is a continuation-in-part of copending application U.S. Ser. No. 707,367 filed Mar. 1, 1985, now abandoned.

BACKGROUND OF THE INVENTION

1. Field of the Invention

This invention relates to free radical polymerization processes employing cobalt(II) chelates of vicinal iminohydroxyimino compounds, dihydroxyimino compounds, diazadihydroxyiminodialkyldecadienes and diazadihydroxyiminodialkylundecadienes as catalytic chain transfer agents for controlling the molecular weight of the homopolymers and copolymers produced.

2. Background

In any polymerization process it is necessary to be able to control the molecular weight of the polymer produced so that it may be fitted to a particular use or need. For example, in unperturbed polymerization systems which fundamentally tend to produce high molecular weight polymers, it may be desirable or necessary to limit the molecular weight of the polymers produced, and this must be done in a predictable and controllable fashion. Such molecular weight limitation may be desirable or necessary in the preparation of polymer solutions for use in paints and finishes which require high solids contents to assure reduced solvent emission during application, and yet which require low viscosity to facilitate ready application.

In free radical polymerizations there are several conventional means of effecting such molecular weight limitation, but all have notable disadvantages. These include:

(1) The use of a high initiator/monomer ratio, but this is costly in terms of initiator consumption.

(2) Polymerizing at high temperatures, for example, about 150° C., which is undesirably energy intensive.

(3) Adding stoichiometric amounts of thiol chain transfer agents to the polymerizing system, but the attendant incorporation of sulfur-containing agents into the polymer renders it less durable than is desired.

(4) Odor problems associated with the use of sulfur-containing chain transfer agents.

Catalytic chain transfer to the monomer as a means of controlling molecular weight in the radical polymerization of methyl methacrylate and styrene in the presence of cobalt(II) porphyrin complexes is known in the art. N. S. Enikolopyan et al., J. Polym. Sci., Polym. Chem. Ed., Vol. 19, 879 (1981), describe the kinetics and the molecular weight control achieved in the free radical polymerization of methyl methacrylate in the presence of a cobalt complex of hematoporphyrin tetramethyl ether. This use of this cobalt complex is also discussed by B. R. Smirnov et al. in Vysokomol. soyed., A23, No. 5, 1042 (1981) and by B. R. Smirnov et al. in Dokl. Akad. Nauk SSSR, 253, 891 (1980). In a similar study, B. R. Smirnov et al., Dokl. Akad. Nauk SSSR, 254, 127 (1980), describe studies carried out with hematoporphyrin tetramethyl ester. The authors conclude that only the combination of cobalt with a tetrapyrrole porphyrin ligand apparently permits the realization of catalysis of chain transfer to the monomer, and that it has been ruled out that analogous phenomena will be discovered during the investigation of complexes similar in spatial and electronic structure to the porphyrins, such as phthalocyanines, corrins, cobaloximes, etc. B. R. Smirnov et al., Vysokomol. soyed., A23, No. 11, 2588 (1981), describe the catalytic chain transfer observed in the radical polymerization of styrene in the presence of a cobalt complex of hematoporphyrin IX tetramethyl ester.

D. E. Pashchenko et al., Dokl. Akad. Nauk SSSR, 265, 889 (1982), describe chain transfer studies with cobalt porphyrins in the polymerization of methyl methacrylate. Regarding this paper, it is not understood what is meant by "cobalt complexes of porphyrins and cobaloximes" since there is no further mention of "cobaloximes" in the English language version of the paper; moreover, the term "cobaloximes" does not appear in the original Russian text, but rather the term "cobalamines", which are vitamin B12-related structures similar to the porphyrin structures disclosed in this paper and in the other publications cited above.

Although the use of the porphyrin complexes circumvents many of the problems associated with the aforesaid conventional commercial processes, the complexes impart too much color to the final product, rendering it useless or less desirable in many applications, such as in certain paints and finishes. Moreover, the cost of the porphyrin complex is rather high.

A. F. Burczyk et al., J. Polym. Sci., Polym. Chem. Ed., Vol. 22, 3255 (1984), disclose that cobaloximes, that is, bisdimethylgloximatocobalt complexes, are often used as analogs of cobalt porphyrins in research studies, and they further disclose the use of cobaloxime, synthesized from Co(II) acetate and dimethylglyoxime, as a relatively cheap chain transfer agent in the free radical polymerization of methyl methacrylate. The cobaloxime of Burczyk et al. is shown on page 3256 as being of the formula

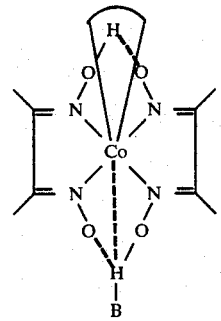

wherein B is a coordinating base ligand, such as triphenylphosphine. Similar disclosures are made by A. F. Burczyk in a thesis to the University of Waterloo, Waterloo, Ontario, 1984.

Carlson et al., U.S. Pat. No. 4,526,945, also disclose the use of cobalt(II) dimethylgloxime and similar cobalt(II) dioxime pyridine complexes such as those derived from 2,3-butanedione, 2,3-hexanedione, 2,4-heptanedione, 2,5-dimethyl-3,4-hexanedione, 3-methyl-2,4-hexanedione, 1,2-cyclohexanedione, 3-phenyl-2,4-pentanedione, 2-naphthylglyoxal, camphoroquinone, 4-chloro-1,2-benzoquinone, 1,2-napthoquinone, 3,7-dimethyl-1,2-napthoquinone, 3-chloro-1,2-napthoquinone or substituted 1,2-anthraquinones as molecular weight control agents in homogeneous polymerizations.

H. C. Rai et al., Indian Journal of Chemistry, Vol. 18A, 242 (1979), describe the preparation of the cobalt chelates of cobalt(II) with 4,7-diaza-2,9-dihydroxyimino-3,8-dimethyldeca-3,7-diene and cobalt(II) with 4,8-diaza-2,1-dihydroxyimino-3,9-dimethylundeca-3,8-diene. There is no disclosure as to the use of these compounds as catalytic chain transfer agents. E. Uhlig et al., Z. anorg. allg. Chem., 343, 299 (1966), describe the preparation of the ligands 4,7-diaza-2,9-dihydroxyimino-3,8-dimethyldeca-3,7-diene and 4,8-diaza-2,10-dihydroxyimino-3,9-dimethylundeca-3,8-diene compounds. G. N. Schrauzer, Inorg. Syn., 11, 62, 64 (1968), describes the preparation of diaqua bis(2,3-dihydroxyiminobutanato)Co(II). A. Bakac et al., J. Am. Chem. Soc., 106, 5197 (1984), describe the preparation of Co-(II)(2,3-dioxyiminobutane-BF$_2$)$_2$(H$_2$O)$_2$.

It is an object of this invention to provide cobalt(II) chelates of vicinal iminohydroxyimino compounds, dihydroxyimino compounds, diazadihydroxyiminodialkyldecadienes and diazadihydroxyiminodialkylundecadienes which operate as highly efficient catalytic chain transfer agents for controlling homopolymer and copolymer molecular weights, while imparting very little, if any, color to the final products, making them more useful in many applications, such as in paints and finishes.

Another object is to provide such a process which proceeds at modest temperatures, for example, about 65° to about 110° C., with limited amounts of initiator and in the absence of stoichiometrically-reacting chain transfer agents. These and other objects will become apparent hereinafter.

SUMMARY OF THE INVENTION

The present invention provides improved processes for controlling the molecular weight of homopolymers and copolymers produced in free radical polymerizations, the improvement characterized in that molecular weight control is effected by means of a cobalt chelate chain transfer agent of the formula

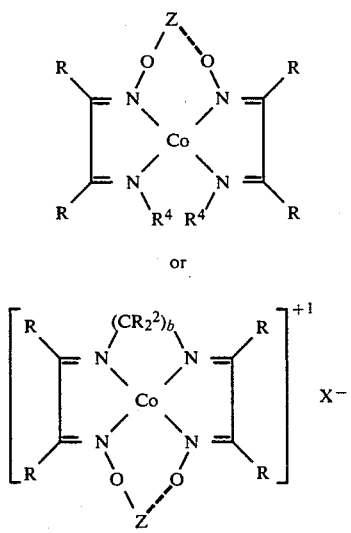

wherein each R, independently, is phenyl or $C_1$ to $C_{12}$ alkyl wherein each α-carbon atom contains two hydrogen atoms, or R and R on adjacent carbon atoms, taken together, is $C_5$ to $C_8$ cycloalkylene, unsubstituted in the α-positions, —CH=CH—CH=CH—,

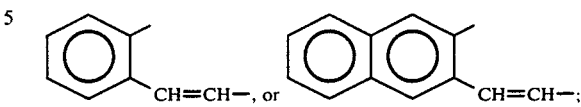

$R^2$ is H or $C_xH_{2x+1}$ wherein x is 1 to 12; each $R^4$, independently, is H or $C_xH_{2x+1}$ wherein X is 1 to 12, or both $R^4$ groups taken together is —O—Z—O—; n is 2 or 3; Z is BF$_2$, BCl$_2$, BBr$_2$ or BR$_2^2$; and X$^-$ is NO$_3^-$, Cl$^-$, Br$^-$, I$^-$, BF$_4^-$, PF$_6^-$, SbF$_6^-$ or R$^1$COO$^-$ wherein R$^1$ is C$_1$ to C$_{12}$ alkyl.

DETAILED DESCRIPTION OF THE INVENTION

This invention resides in polymerization processes employing cobalt(II) chelates as catalytic chain transfer agents for controlling the molecular weights of the homopolymers and copolymers produced. The cobalt chelates consist of cobalt(II) coordinated to the following ligands: vicinal iminohydroxyimino and dihydroxyimino compounds (I), and diazadihydroxyiminodialkyldecadienes and -undecadienes (II). By "ligand", as the term is used herein, is meant any atom, radical or molecule which can bind to a characteristic or central element of a complex. The structures of the aforesaid ligands are given below.

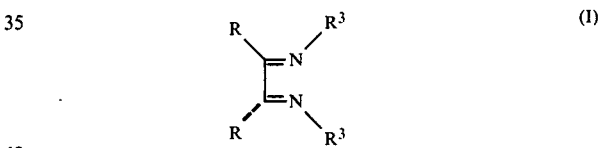

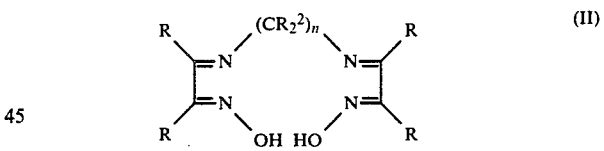

In the aforesaid formulas each R, independently, is phenyl or $C_1$ to $C_{12}$ alkyl wherein each α-carbon atom contains two hydrogen atoms, that is, is unsubstituted, or R and R on adjacent carbon atoms, taken together, is $C_5$ to $C_8$ cycloalkylene, unsubstituted in the α-positions, —CH=CH—CH=CH—,

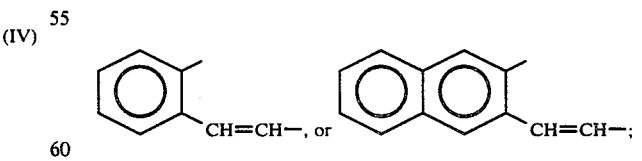

$R^2$ is H or $C_xH_{2x+1}$ wherein x is 1 to 12; each $R^3$, independently, is H, $C_xH_{2x+1}$ wherein x is 1 to 12, or OH, with at least one being OH; and n is 2 or 3. The corresponding structures for the cobalt chelates of these ligands are given below. More specifically, the corresponding cobalt chelate of structure I is III, and the corresponding cobalt chelate of structure II is IV.

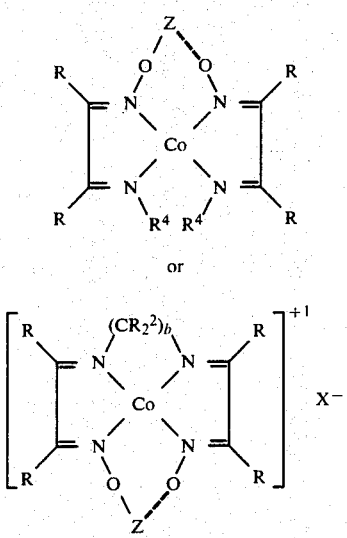

In formulas III and IV, R, $R^2$ and n are as defined above; each $R^4$, independently, is H or $C_xH_{2x+1}$ wherein X is 1 to 12, or both $R^4$ groups taken together is —O—Z—O—; Z is $BF_2$, $BCl_2$, $BBr_2$ or $BR_2^2$; and $X^-$ is $NO_3^-$, $Cl^-$, $Br^-$, $I^-$, $BF_4^-$, $PF_6^-$, $SbF_6^-$ or $R^1COO^-$ wherein $R^1$ is $C_1$ to $C_{12}$ alkyl. The cobalt chelates of the above formulas may also, but need not, be coordinated with additional ligands derived from materials present in the reaction medium such as water, alcohols or ketones.

Preparation of iminohydroxyimino compounds, dihydroxyimino compounds, diazadihydroxyiminodialkyldecadienes and diazadihydroxyiminodialkylundecadienes, and cobalt chelate catalytic chain transfer agents of Formulas III and IV from such iminohydroxyimino compounds, dihydroxyimino compounds, diazadihydroxyiminodialkyldecadienes and diazadihydroxyiminodialkylundecadienes can be accomplished using methods known in the art, such as those set forth in H. C. Rai et al., Indian Journal of Chemistry, Vol. 18A, 242 (1979), E. Uhlig et al., Z. anorg. allg. Chem., 343, 299 (1966), G. N. Schrauzer, Inorg. Syn., 11, 62 (1968), and A. Bakac et al., J. Am. Chem. Soc., 106, 5197 (1984).

The preferred chain transfer agents herein are cobalt-(II) salts coordinated to the ligands of Formula I wherein both $R^4$ groups taken together is —O—Z—-O—. Most preferred are Co(II)(2,3-dioxyiminobutane-$BF_2$)$_2$, Co(II)(1,2-dioxyiminocyclohexane-$BF_2$)$_2$, and Co(II)(1,2-diphenyl-1,2-dioxyiminoethane-$BF_2$)$_2$.

The polymerization can be carried out either in the absence of a polymerization medium, as a bulk polymerization, or alternatively, in the presence of a polymerization medium, as a solution, suspension or emulsion polymerization.

Many common organic solvents are suitable as solution polymerization media. These include aromatic hydrocarbons, such as benzene, toluene and the xylenes; ethers, such as tetrahydrofuran, diethyl ether and the commonly available ethylene glycol and polyethylene glycol monoalkyl and dialkyl ethers, including the Cellosolves ® and Carbitols ®; alkyl esters of acetic, propionic and butyric acids; mixed ester-ethers, such as monoalkyl ether-monoalkanoate esters of ethylene glycol; and amides such as formamides and acid amides. In addition, ketones, such as acetone, butanone, pentanone and hexanone, are suitable, as are alcohols, such as methanol, ethanol, propanol and butanol. Water may be used as a solvent for water soluble monomers. In some instances, it may be advantageous to use mixtures of two or more solvents.

In emulsion and suspension polymerizations, the suitable medium is water in combination with any conventional suspending or emulsifying agent. Emulsifying agents can be anionic such as sodium dodecylsulfate or cationic such as hexadecyltrimethylammonium bromide. The suspending agent used in the reaction can be Acrysol A-3, a polyacrylic acid made by Rohm & Haas Company.

The bulk and solution polymerizations can be carried out at 50°–150° C., with the preferred range 80°–110° C. The emulsion and suspension polymerizations can be carried out at 25°–90° C., with the preferred range 65°–80° C.

Any of the known class of azo polymerization initiators is suitable provided it has solubility in the solvent, monomer mixture, or water, as the case may be, and has an appropriate half life at the temperature of polymerization. "Appropriate half life", as used herein, is a half life of about 1–4 hours. Typical of such initiators, but not restricted to them, are azocumene, 2,2'-azobis-(isobutyronitrile), 2,2'-azobis(2-methyl)butanenitrile, 4,4'-azobis(4-cyanovaleric acid), and 2-(t-butylazo)-2-cyanopropane. Other soluble non-azo initiators having an appropriate half life may also be used, including, among others, benzoyl peroxide, lauroyl peroxide, persulfates, and molecular hydrogen.

The process of the invention can be carried out as either a batch or feed process. In either type of process the polymer is isolated by stripping off solvent and unreacted monomer or by precipitation with a nonsolvent. Alternatively, the polymer solution may be used as such if appropriate to its application.

The process of the invention can be carried out with monomers such as methacrylate; acrylate; acrylic acid; styrene; vinyl acetate; acrylonitrile; methacrylonitrile; vinyl halides of the formula $CH_2=CHX$, wherein X is Cl or F; vinylidene halides of the formula $CH_2=C(X)_2$, wherein each X is, independently, Cl or F; substituted butadienes of the formula $CH_2=C(R)C(R)=CH_2$, wherein each R is, independently, H, $C_1$ to $C_{10}$ alkyl, Cl or F; ethylenesulfonic acid derivatives of the formula $CH_2=CHSO_3X$, wherein X is Na, K, Li, N(R)$_4$, H, R, or $(CH_2)_nZ$, each R is, independently, $C_1$ to $C_{10}$ alkyl, n is an integer from 1 to 10, Z is COOY, OH, N(R)$_2$, or $SO_3Y$, and Y is H, Li, Na, K or N(R)$_4$; acrylamide derivatives of the formula $CH_2=CHCON(R)_2$, wherein each R is, independently, H, $C_1$ to $C_{10}$ alkyl, or $(CH_2)_nZ$, n is an integer from 1 to 10, Z is COOY, OH, N(R)$_2$, or $SO_3Y$ and Y is H, Li, Na, K, or N(R)$_4$; methacrylamide derivatives of the formula $CH_2=C(CH_3)CON(R)_2$, wherein each R is, independently, H, $C_1$ to $C_{10}$ alkyl or $(CH_2)_nZ$, n is an integer from 1 to 10, Z is COOY, OH, N(R)$_2$, $SO_3Y$, and Y is H, Li, Na, K, or N(R)$_4$; vinyl acetates of the formula $CH_2=CHOOCR$, wherein R is $C_1$ to $C_{10}$ alkyl; and with any and all monomer mixtures thereof.

The bulk and solution polymerizations of the invention are carried out most effectively with styrene, methacrylate ester, and methacrylonitrile monomers. The suspension and emulsion polymerizations of the instant invention are carried out most effectively with methacrylate ester momomers. Methacrylates which are useful in this invention include branched alkyl or n-alkyl esters of $C_{1-12}$ alcohols and methacrylic acid, for example, methyl and ethyl methacrylate. Other monomers include, but are not restricted to, allyl, glycidyl, hydroxyalkyl (for example, hydroxyethyl and hydroxypropyl), allyloxyethyl, 2,4-hexadienyl (sorbyl) and dialkylaminoalkyl methacrylates.

To ensure maximum catalyst activity the polymerizations should be carried out in the substantial absence of oxygen under an inert atmosphere, such as nitrogen, argon or other non-oxidizing gas. "Deaeration", as the term is used herein, means the substantial removal of oxygen.

The invention is further described in the Examples set forth below. The polymerizations discussed therein were conducted substantially according to the following General Procedures, except where otherwise indicated. In the General Procedures and Examples, all parts are by weight, and all temperatures are given in degrees Celsius, unless otherwise stated. It should be noted that where values are less than 1000, molecular weight is difficult to determine with accuracy. Nevertheless, the decrease in molecular weight shown by these valves is an accurate reflection of molecular weight control.

GENERAL PROCEDURES

A. Solution Polymerization

In a nitrogen drybox, 21.4 ml (0.2 mol) of methyl methacrylate, which had been previously sparged with nitrogen and passed through a column of Woelm alumina (grade 1), was added to a 100 ml volumetric flask. To this was added the desired amount of cobalt catalyst and the volume was brought to 100 ml with distilled methanol.

To a 300 ml round bottom flask were added 0.062 g ($2.5 \times 10^{-4}$ mol) of 2,2-azobis(2-methyl)butanenitrile and the contents of the volumetric flask. The reaction mixture was then stirred to dissolve the 2,2'-azobis(2-methyl)butanenitrile and a gas chromatography (G.C.) sample was taken. The round bottom flask was capped with a water cooled condenser, brought out of the drybox and heated to reflux under nitrogen for six hours. The reaction mixture was then allowed to cool to room temperature and a second G.C sample was taken. The poly(methyl methacrylate) which was produced was isolated by removing solvent and monomer from the reaction mixture via a rotary evaporator. Gel permeation chromatography (GPC) was used to determine the average molecular weight ($\overline{M}_w$) and average molecular number ($\overline{M}_n$) of the polymer produced.

B. Suspension Polymerization

In a nitrogen dry box, 21.4 ml (0.2 mole) of methyl methacrylate, previously sparged with nitrogen and passed through a column of Woelm alumina (grade 1), 0.248 g ($1.0 \times 10^{-3}$ moles) of 2,2'-azobis[2-methyl]butanenitrile and the desired amount of cobalt catalyst were placed into a 300 ml three neck round bottom flask equipped with a reflux condenser, septum and mechanical stirrer. The flask was brought out of the dry box and 60 ml of aqueous Acrysol A-3 [prepared by adding 75.5 g Acrysol A-3 to 1500 ml of water and degassed overnight] was added under an atmosphere of nitrogen. The flask was placed in a bath at 65°, the stirrer set at 400 rpm and the reaction allowed to proceed for two hours. A nitrogen atmosphere was maintained in the flask throughout the course of the reaction. After the allotted time, the reaction mixture was cooled to room temperature and the polymer collected by filtration. The polymer was washed with water and dried. GPC was used to determine $\overline{M}_w$ and $\overline{M}_n$ of the polymer produced.

C. Emulsion Polymerization

In a nitrogen dry box, 21.4 ml (0.2 mole) of methyl methacrylate, previously sparged with nitrogen and passed through a column of Woelm alumina (grade 1), 0.374 g 4,4'-azobis(4-cyanovaleric acid) and the desired amount of cobalt catalyst were placed into a 300 ml three neck round bottom flask equipped with a reflux condenser, septum, and mechanical stirrer. The flask was brought out of the dry box and 60 ml of 0.1M aqueous sodium dodecylsulfate (degassed) was added under an atmosphere of nitrogen. The flask was placed in a bath at 80°, the stirrer set at 400 rpm and the reaction allowed to proceed for four hours. A nitrogen atmosphere was maintained in the flask throughout the course of the reaction. After the allotted time, the reaction mixture was cooled to room temperature and the polymer precipitated by adding 150 ml of methanol. The polymer was collected by filtration, washed with methanol, washed with water, and air dried. GPC was used to determine $\overline{M}_w$ and $\overline{M}_n$ of the polymer produced.

EXAMPLES 1-3

A. Preparation of [Co(II)(DHIB-BF$_2$)$_2$(H$_2$O)$_2$]

[DHIB=2,3 dioxyiminobutane]

The title compound was prepared by the method of A. Bakac et al., J. Am. Chem. Soc., 106, 5197–5202 (1984).

The suspension resulting from the addition of 10 ml of BF$_3$.Et$_2$O to 2 g of Co(OAc)$_2$.4H$_2$O and 1.9 g of 2,3-dihydroxyiminobutane in 150 ml of diethyl ether was stirred at room temperature overnight. The resultant solid [Co(II)(DHIB-BF$_2$)$_2$(H$_2$O)$_2$] was collected by filtration, placed into 250 ml of methanol and heated to reflux. The solid which did not dissolve was removed by filtration (0.336 g). The remaining clear solution was placed in a freezer overnight. The crystallized product was recovered by filtration and dried (0.468 g). The remaining solution was reduced to a volume of 30 ml under vacuum and placed in a freezer ($-25°$ C.) overnight. An additional 0.101 g of product was recovered. The infrared spectra of the product exhibited bands at 3581 cm$^{-1}$ (H$_2$O) and 1623 cm$^{-1}$, 950 cm$^{-1}$ (BF).

B. The Use of [Co(II)(DHIB-BF$_2$)$_2$(H$_2$O)$_2$] as a Catalytic Chain Transfer Agent in the Free Radical Solution Polymerization of Methyl Methacrylate The General Procedure for solution polymerization was followed using the indicated amount of Co(II)(DHIB-BF$_2$)$_2$(H$_2$O)$_2$ as catalyst. The results are listed below.

| Example | Catalyst | $\overline{M}_n$ | $\overline{M}_w$ | $\overline{M}_w/\overline{M}_n$ |
|---------|----------|------|------|-----------|
| 1 | $6.0 \times 10^{-6}$ M | 1470 | 2740 | 1.86 |
| 2 | $3.0 \times 10^{-5}$ M | 301 | 512 | 1.70 |
| 3 | $1.5 \times 10^{-4}$ M | 65 | 134 | 2.06 |

A colorless product was observed.

A repeat of the above experiment with no catalyst gave $\overline{M}_n$ 45,800, $\overline{M}_w$ 122,000 and $\overline{M}_w/\overline{M}_n$ 2.66.

COMPARATIVE EXAMPLES 1-2

Attempted Use of Co(II)(DHIB-H)$_2$(Ph$_3$P) and Co(II)(DHIB-H)$_2$(C$_5$H$_5$N) as Catalytic Chain Transfer Agents in the Free Radical Solution Polymerization of Methyl Methacrylate

[PH$_3$P = Triphenyl phosphine]

The General Procedure for solution polymerization was followed using the indicated type and amount of Co(II) catalyst. The results are listed below.

| Example | Catalyst | $\overline{M}n$ | $\overline{M}w$ | $\overline{M}w/\overline{M}n$ |
|---|---|---|---|---|
| 1 | Co(II)(DHIB)$_2$ (Ph$_3$P) [6.0 × 10$^{-6}$ M] | 24,600 | 56,800 | 2.31 |

| Example | Catalyst | $\overline{M}n$ | $\overline{M}w$ | $\overline{M}w/\overline{M}n$ |
|---|---|---|---|---|
| 2 | Co(II)(DHIB)$_2$ (C$_5$H$_5$N) [6.0 × 10$^{-6}$ M] | 39,500 | 82,100 | 2.08 |

EXAMPLES 4-6

The Use of Co(II)(DHIB-BF$_2$)$_2$(H$_2$O)$_2$ as a Catalytic Chain Transfer Agent in the Free Radical Solution Polymerization of Methyl Acrylate The General Procedure for solution polymerization was followed using the indicated amount of Co(II)(DHIB-BF$_2$)$_2$(H$_2$O)$_2$ as catalyst, methyl acrylate as monomer, 2,2'-azobis(isobutyronitrile) as initiator and methyl ethyl ketone as solvent. The cobalt catalyst was prepared according to the procedure described in Examples 1-3. The results are listed below.

| Example | Catalyst | $\overline{M}n$ | $\overline{M}w$ | $\overline{M}w/\overline{M}n$ |
|---|---|---|---|---|
| 4 | 5 × 10$^{-6}$ M | 14,600 | 48,600 | 3.33 |
| 5 | 5 × 10$^{-5}$ M | 7,700 | 23,300 | 3.03 |
| 6 | 5 × 10$^{-4}$ M | 1,620 | 4,380 | 2.70 |

A colorless product was observed.

A repeat of the above experiment with no catalyst gave $\overline{M}n$ 17,300, $\overline{M}w$ 56,500 and $\overline{M}w/\overline{M}n$ 3.27.

EXAMPLES 7-9

The Use of Co(II)(DHIB-BF$_2$)$_2$(H$_2$O)$_2$ as a Catalytic Chain Transfer Agent in the Free Radical Solution Polymerization of Styrene The General Procedure for solution polymerization was followed using the indicated amount of Co(II)(DHIB-BF$_2$)$_2$(H$_2$O)$_2$ as catalyst, styrene as monomer, 2,2'-azobis(isobutyronitrile) as initiator, and methyl ethyl ketone as solvent. The cobalt catalyst was prepared according to the procedure described in Examples 1-3. The results are listed below.

| Example | Catalyst | $\overline{M}n$ | $\overline{M}w$ | $\overline{M}w/\overline{M}n$ |
|---|---|---|---|---|
| 7 | 5 × 10$^{-6}$ M | 5,210 | 14,600 | 2.80 |
| 8 | 5 × 10$^{-5}$ M | 734 | 1,580 | 2.15 |
| 9 | 5 × 10$^{-4}$ M | 45 | 122 | 2.71 |

A colorless product was observed.

A repeat of the above experiment with no catalyst gave $\overline{M}n$ 21,700, $\overline{M}w$ 48,700 and $\overline{M}w/\overline{M}n$ 2.24.

EXAMPLES 10-12

The Use of Co(II)(DHIB-BF$_2$)$_2$(H$_2$O)$_2$ as a Catalytic Chain Transfer Agent in the Free Radical Solution Polymerization of Methyl Methacrylate The General Procedure for solution polymerization was followed using the indicated amount of Co(II)(DHIB-BF$_2$)$_2$(H$_2$O)$_2$ as catalyst, methyl methacrylate as monomer, 2,2'-azobis(isobutyronitrile) as initiator, and methyl ethyl ketone as solvent. The cobalt catalyst was prepared according to the procedure described in Examples 1-3. The results are listed below.

| Example | Catalyst | $\overline{M}n$ | $\overline{M}w$ | $\overline{M}w/\overline{M}n$ |
|---|---|---|---|---|
| 10 | 5 × 10$^{-6}$ M | 1,020 | 2,110 | 2.07 |
| 11 | 5 × 10$^{-5}$ M | 90 | 219 | 2.43 |
| 12 | 5 × 10$^{-4}$ M | 48 | 59 | 1.20 |

A colorless product was observed.

A repeat of the above experiment with no catalyst gave $\overline{M}n$ 37,100, $\overline{M}w$ 77,400 and $\overline{M}w/\overline{M}n$ 2.09.

EXAMPLES 13-15

The Use of Co(II)(DHIB-BF$_2$)$_2$(H$_2$O)$_2$ as a Catalytic Chain Transfer Agent in the Free Radical Solution Polymerization of Methylacrylonitrile The General Procedure for solution polymerization was followed using the indicated amount of Co(II)(DHIB-BF$_2$)$_2$(H$_2$O)$_2$ as catalyst, methacrylonitrile as monomer, 2,2'-azobis(isobutyronitrile) as initiator, and methyl ethyl ketone as solvent. The cobalt catalyst was prepared according to the procedure described in Examples 1-3. The results are listed below.

| Example | Catalyst | $\overline{M}n$ | $\overline{M}w$ | $\overline{M}w/\overline{M}n$ |
|---|---|---|---|---|
| 13 | 5 × 10$^{-6}$ M | 341 | 492 | 1.44 |
| 14 | 5 × 10$^{-5}$ M | 71 | 113 | 1.59 |
| 15 | 5 × 10$^{-4}$ M | 56 | 93 | 1.66 |

A colorless product was observed.

A repeat of the above experiment with no catalyst gave $\overline{M}n$ 1,140, $\overline{M}w$ 1,950 and $\overline{M}w/\overline{M}n$ 1.71.

EXAMPLES 16-18

The Use of Co(II)(DHIB-BF$_2$)$_2$(H$_2$O)$_2$ as a Catalytic Chain Transfer Agent in the Free Radical Solution Polymerization of Isoprene The General Procedure for solution polymerization was followed using the indicated amount of Co(II)(DHIB-BF$_2$)$_2$(H$_2$O)$_2$ as catalyst, isoprene as monomer, 2,2'-azobis(isobutyronitrile) as initiator, and methyl ethyl ketone as solvent. The cobalt catalyst was prepared according to the procedure described in Examples 1-3. The molecular weight values were determined by nuclear magnetic resonance spectroscopy (NMR). The results are listed below.

| Example | Catalyst | $\overline{M}w$ |
|---|---|---|
| 16 | 5 × 10$^{-6}$ M | 307 |
| 17 | 5 × 10$^{-5}$ M | 245 |
| 18 | 5 × 10$^{-4}$ M | 157 |

A colorless product was observed.

A repeat of the above experiment with no catalyst gave $\overline{M}w$ 320.

EXAMPLES 19-21

The Use of $Co(II)(DHIB-BF_2)_2(H_2O)_2$ as a Catalytic Chain Transfer Agent in the Free Radical Solution Polymerization of Vinyl Acetate The General Procedure for solution polymerization was followed using the indicated amount of $Co(II)(DHIB-BF_2)_2(H_2O)_2$ as catalyst, vinyl acetate as monomer, 2,2'-azobis(isobutyronitrile) as initiator and methyl ethyl ketone as solvent. The cobalt catalyst was prepared according to the procedure described in Examples 1-3. The results are listed below.

| Example | Catalyst | $\overline{M}n$ | $\overline{M}w$ | $\overline{M}w/\overline{M}n$ |
|---|---|---|---|---|
| 19 | $5 \times 10^{-6}$ M | 1,610 | 3,420 | 2.12 |
| 20 | $5 \times 10^{-5}$ M | 1,660 | 3,510 | 2.11 |
| 21 | $5 \times 10^{-4}$ M | 891 | 2,120 | 2.38 |

A colorless product was observed.

A repeat of the above experiment with no catalyst gave $\overline{M}n$ 1,660, $\overline{M}w$ 3,579 and $\overline{M}w/\overline{M}n$ 2.16.

EXAMPLES 22-24

The Use of $Co(II)(DHIB-BF_2)_2(H_2O)_2$ as a Catalytic Chain Transfer Agent in the Free Radical Solution Polymerization of Acrylonitrile The General Procedure for solution polymerization was followed using the indicated amount of $Co(II)(DHIB-BF_2)_2(H_2O)_2$ as catalyst, acrylonitrile as monomer, 2,2'-azobis(isobutyronitrile) as initiator and methyl ethyl ketone as solvent. The cobalt catalyst was prepared according to the procedure described in Examples 1-3. In the results listed below, $[\eta]$ is the intrinsic viscosity which is proportional to molecular weight. The higher the value of $[\eta]$, the higher the molecular weight. These values were determined by capillary viscometry (CV).

| Example | Catalyst | $[\eta]$ dl/g |
|---|---|---|
| 22 | $5 \times 10^{-6}$ M | 0.5465 |
| 23 | $5 \times 10^{-5}$ M | 0.5410 |
| 24 | $5 \times 10^{-4}$ M | 0.4483 |

A colorless product was observed.

A repeat of the above experiment with no catalyst gave $[\eta]$ dl/g 0.5533.

EXAMPLE 25

The Use of $Co(II)(DHIB-BF_2)_2(H_2O)_2$ as a Catalytic Chain Transfer Agent in the Free Radical Solution Polymerization of 2-Acrylamido-2-methylpropanesulfonic Acid The General Procedure for solution polymerization was followed using the indicated amount of $Co(II)(DHIB-BF_2)_2(H_2O)_2$ as catalyst, 0.1 mole 2-acrylamido-2-methylpropanesulfonic acid as monomer, $1.0 \times 10^{-3}$ moles of 2,2'-azobis(isobutyronitrile) as initiator and 100 ml of dimethylformamide as solvent. The cobalt catalyst was prepared according to the procedure described in Examples 1-3. The contents were heated at 100° C. under a nitrogen atmosphere for 90 minutes. The result, listed below, was determined by CV. $[\eta]$ is defined in Examples 22-24.

| Catalyst | $[\eta]$ dl/g |
|---|---|
| $5 \times 10^{-4}$ M | 0.1150 |

A colorless product was observed.

A repeat of the above experiment with no catalyst gave $[\eta]$ dl/g 0.1525.

EXAMPLE 26

The Use of $Co(II)(DHIB-BF_2)_2(H_2O)_2$ as a Catalytic Chain Transfer Agent in the Free Radical Solution Polymerization of 2-Acrylamido-2-methylpropanesulfonic Acid The General Procedure for solution polymerization was followed using the indicated amount of $Co(II)(DHIB-BF_2)_2(H_2O)_2$ as catalyst, 0.1 mole of 2-acrylamido-2-methylpropanesulfonic acid as monomer, 0.374 g of 4,4'-azobis(4-cyanovaleric acid) as the initiator and 100 ml of water as solvent. The cobalt catalyst was prepared according to the procedure described in Examples 1-3. The contents were heated at 100° C. under a nitrogen atmosphere for 30 minutes. The result, listed below, was determined by CV. $[\eta]$ is defined in Examples 22-24.

| Catalyst | $[\eta]$ dl/g |
|---|---|
| $5 \times 10^{-4}$ M | 0.5832 |

A colorless product was observed.

A repeat of the above experiment with no catalyst gave $[\eta]$ dl/g 0.8078.

EXAMPLE 27

The Use of $Co(II)(DHIB-BF_2)_2(H_2O)_2$ as a Catalytic Chain Transfer Agent in the Free Radical Solution Polymerization of Methacrylic Acid Example 26 was repeated using methacrylic acid as monomer. The result is listed below.

| Catalyst | $[\eta]$ dl/g |
|---|---|
| $5 \times 10^{-4}$ M | 0.0540 |

A colorless product was observed.

A repeat of the above experiment with no catalyst gave $[\eta]$ dl/g 0.6862.

EXAMPLES 28-31

The Use of $Co(II)(DHIB-BF_2)_2(H_2O)_2$ as a Catalytic Chain Transfer Agent in the Free Radical Suspension Polymerization of Methyl Methacrylate The General Procedure for suspension polymerization was followed using the indicated amount of $Co(II)(DHIB-BF_2)_2(H_2O)_2$ as catalyst. The cobalt catalyst was prepared according to the procedure described in Examples 1-3. The results are listed below.

| Example | Catalyst | $\overline{M}n$ | $\overline{M}w$ | $\overline{M}w/\overline{M}n$ |
|---|---|---|---|---|
| 28 | 0.25 ppm | 109,000 | 668,000 | 6.10 |
| 29 | 2.50 ppm | 41,400 | 150,000 | 3.62 |
| 30 | 25 ppm | 1,050 | 2,990 | 2.83 |

| Example | Catalyst | $\overline{M}n$ | $\overline{M}w$ | $\overline{M}w/\overline{M}n$ |
|---|---|---|---|---|
| 31 | 100 ppm | 307 | 1,650 | 5.38 |

A colorless product was observed.

A repeat of the above experiment with no catalyst gave $\overline{M}n$ 110,000, $\overline{M}w$ 865,000 and $\overline{M}w/\overline{M}n$ 7.86.

EXAMPLES 32–34

The Use of $Co(II)(DHIB-BF_2)_2(H_2O)_2$ as a Catalytic Chain Transfer Agent in the Free Radical Emulsion Polymerization of Methyl Methacrylate The General Procedure for emulsion polymerization was followed using the indicated amount of $Co(II)(DHIB-BF_2)_2(H_2O)_2$ as catalyst. The cobalt catalyst was prepared according to the procedure described in Examples 1–3.

| Example | Catalyst | $\overline{M}n$ | $\overline{M}w$ | $\overline{M}w/\overline{M}n$ |
|---|---|---|---|---|
| 32 | 0.25 ppm | 120,000 | 375,000 | 3.12 |
| 33 | 2.50 ppm | 17,900 | 36,100 | 2.02 |
| 34 | 100 ppm | 497 | 1,700 | 2.15 |

A colorless product was observed.

A repeat of the above experiment with no catalyst gave $\overline{M}n$ 675,000, $\overline{M}w$ 3,694,000 and $\overline{M}w/\overline{M}n$ 5.48.

EXAMPLES 35–37

The Use of $Co(II)(DHIB-BF_2)_2(H_2O)_2$ as a Catalytic Chain Transfer Agent in the Free Radical Suspension Polymerization of Methyl Methacrylate The General Procedure for suspension polymerization was followed using the indicated amount of $Co(II)(DHIB-BF_2)_2(H_2O)_2$ as catalyst and 0.025 g of initiator. The cobalt catalyst was prepared according to the procedure described in Examples 1–3. The results are listed below.

| Example | Catalyst | $\overline{M}n$ | $\overline{M}w$ | $\overline{M}w/\overline{M}n$ |
|---|---|---|---|---|
| 35 | 0.25 ppm | 244,000 | 1,788,000 | 7.31 |
| 36 | 2.5 ppm | 41,500 | 332,000 | 8.00 |
| 37 | 25 ppm | 727 | 1,450 | 1.99 |

A colorless product was observed.

A repeat of the above experiment with no catalyst gave $\overline{M}n$ 481,000, $\overline{M}w$ 3,283,000 and $\overline{M}/\overline{M}n$ 6.83.

EXAMPLES 38–40

The Use of $Co(II)(DHIB-BF_2)_2(H_2O)_2$ as a Catalytic Chain Transfer Agent in the Free Radical Emulsion Polymerization of Methyl Methacrylate The General Procedure for emulsion polymerization was followed using the indicated amount of $Co(II)(DHIB-BF_2)_2(H_2O)_2$ as catalyst and 0.037 g of initiator. The cobalt catalyst was prepared according to the procedure described in Examples 1–3. The results are listed below.

| Example | Catalyst | $\overline{M}n$ | $\overline{M}w$ | $\overline{M}w/\overline{M}n$ |
|---|---|---|---|---|
| 38 | 0.25 ppm | 153,000 | 498,000 | 3.25 |
| 39 | 2.5 ppm | 25,700 | 54,500 | 2.12 |
| 40 | 25 ppm | 1,260 | 3,280 | 2.61 |

A colorless product was observed.

A repeat of the above experiment with no catalyst gave $\overline{M}n$ 2,926,000, $\overline{M}w$ 7,002,000 and $\overline{M}w/\overline{M}n$ 2.39.

EXAMPLE 41

The Use of $Co(II)(DHIB-BF_2)_2(H_2O)_2$ as a Catalytic Chain Transfer Agent in the Free Radical Emulsion Polymerization of Methyl Methacrylate The General Procedure for emulsion polymerization was followed using the indicated amount of $Co(II)(DHIB-BF_2)_2(H_2O)_2$ as catalyst and 0.0037 g of initiator. The cobalt catalyst was prepared according to the procedure described in Examples 1–3. The result is listed below.

| Catalyst | $\overline{M}n$ | $\overline{M}w$ | $\overline{M}w/\overline{M}n$ |
|---|---|---|---|
| 2.5 ppm | 206,000 | 1,809,000 | 8.80 |

A colorless product was observed.

A repeat of the above experiment with no catalyst gave $\overline{M}n$ 2,254,000, $\overline{M}w$ 4,736,000 and $\overline{M}w/\overline{M}n$ 2.10.

EXAMPLES 42–43

The Use of $Co(II)(DHIB-BF_2)_2(H_2O)_2$ a as Catalytic Chain Transfer in the Free Radical Emulsion Polymerization of Methyl Methacrylate The General Procedure for emulsion polymerization was followed using the indicated amount of $Co(II)(DHIB-BF_2)_2(H_2O)_2$ as catalyst and hexadecyltrimethylammonium bromide [0.025M] as the cationic emulsifier. The cobalt catalyst was prepared according to the procedure described in Examples 1–3. The results are listed below.

| Example | Catalyst | $\overline{M}n$ | $\overline{M}w$ | $\overline{M}w/\overline{M}n$ |
|---|---|---|---|---|
| 42 | 0.25 ppm | 154,000 | 647,000 | 4.20 |
| 43 | 2.5 ppm | 20,000 | 44,900 | 2.25 |

A colorless product was observed.

A repeat of the above experiment with no catalyst gave $\overline{M}n$ 368,000, $\overline{M}w$ 3,655,000 and $\overline{M}w/\overline{M}n$ 9.93.

EXAMPLE 44

A. Preparation of $Co(II)(DDE-H)_2(H_2O)_2$

[DDE = 1,2-diphenyl-1,2-dioxyiminoethane]

$Co(II)(DDE-H)_2(H_2O)_2$ was prepared by the method of G. N. Schrauzer, Inorg. Syn., 11, 64 (1968).

B. Preparation of $Co(II)(DDE-BF_2)_2(H_2O)_2$

In a dry box, $Co(II)(DDE-H)_2(H_2O)_2$ [5.0 g], $BF_3.O(C_2H_5)_2$ [10.0 ml] and 100 ml of $(C_2H_5)_2O$ were placed into a round bottom flask. The contents were stirred for 24 hours after which time the suspended solids were recovered by filtration and washed with diethyl ether. The recovered solids were dried under vacuum. Product yield = 5.56 g.

C. The Use of $Co(II)(DDE-BF_2)_2(H_2O)_2$ as a Catalytic Chain Transfer Agent in the Free Radical Emulsion Polymerization of Methyl Methacrylate The General Procedure for emulsion polymerization was followed. The concentration of $Co(II)(DDE-BF_2)_2(H_2O)_2$ was 2.5 ppm. The resulting polymer had $\overline{Mn}$ 171,000, $\overline{Mw}$ 1,349,000 and $\overline{Mw}/\overline{Mn}$ 7.88. A colorless product was observed.

EXAMPLE 45

The Use of Co(II)(DDE-BF$_2$)$_2$(H$_2$O)$_2$ as a Catalytic Chain Transfer Agent in the Free Radical Suspension Polymerization of Methyl Methacrylate The General Procedure for suspension polymerization was followed. The cobalt catalyst was prepared according to the procedures described in Example 44. The concentration of Co(II)(DDE-BF$_2$)$_2$(H$_2$O)$_2$ was 2.5 ppm. The resulting polymer had $\overline{Mn}$ 7,420, $\overline{Mw}$ 20,900 and $\overline{Mw}/\overline{Mn}$ 2.81. A colorless product was observed.

EXAMPLE 46

A. Preparation of Co(II)(DC-H)$_2$(H$_2$O)$_2$

DC = 1,2-dioxyiminocyclohexane]

Co(II)(DC-H)$_2$(H$_2$O)$_2$ was prepared by the method of G. N. Schrauzer, Inorg. Syn., 11, 64 (1968).

B. Preparation of Co(II)(DC-BF$_2$)$_2$(H$_2$O)$_2$

In a dry box, Co(II)(DC-H)$_2$(H$_2$O)$_2$ [5.0 g], BF$_3$.O(C$_2$H$_5$)$_2$ [10.0 ml] and 100 ml of (C$_2$H$_5$)$_2$O were placed into a round bottom flask. The contents were stirred for 24 hours after which time the suspended solids were recovered by filtration and washed with diethyl ether. The recovered solids were dried under vacuum. Product yield = 4.09 g.

C. The Use of Co(II)(DC-BF$_2$)$_2$(H$_2$O)$_2$ as a Catalytic Chain Transfer Agent in the Free Radical Emulsion Polymerization of Methyl Methacrylate The General Procedure for emulsion polymerization was followed. The concentration of Co(II)(DC-BF$_2$)$_2$(H$_2$O)$_2$ was 2.5 ppm. The resulting polymer had $\overline{Mn}$ 14,500, $\overline{Mw}$ 31,500 and $\overline{Mw}/\overline{Mn}$ 2.17. A colorless product was observed.

EXAMPLE 47

The Use of Co(II)(DC-BF$_2$)$_2$(H$_2$O)$_2$ as a Catalytic Chain Transfer Agent in the Free Radical Suspension Polymerization of Methyl Methacrylate The General Procedure for suspension polymerization was followed. The cobalt catalyst was prepared according to the procedures described in Example 43. The concentration of Co(II)(DC-BF$_2$)$_2$(H$_2$O)$_2$ was 2.5 ppm. The resulting polymer had $\overline{Mn}$ 8,080, $\overline{Mw}$ 18,300 and $\overline{Mw}/\overline{Mn}$ 2.26. A colorless product was observed.

COMPARATIVE EXAMPLES 3–6

Attempted Use of Co(II)(DHIB-H)$_2$(H$_2$O)$_2$, KCo(CN)$_5$ and Co(II)Salen as Catalytic Chain Transfer Agents in the Free Radical Emulsion Polymerization of Methyl Methacrylate

[Salen = N,N'-bis(salicylidene)ethylenediamines]

The General Procedure for emulsion polymerization was followed using the indicated type and amount of Co(II) catalyst and hexadecyltrimethylammonium bromide [0.025M] as the cationic emulsifier. The results are listed below.

| Example | Catalyst | $\overline{Mn}$ | $\overline{Mw}$ | $\overline{Mw}/\overline{Mn}$ |
|---|---|---|---|---|
| 3 | None | 368,000 | 3,655,000 | 9.93 |
| 4 | Co(II)(DHIB-H)$_2$(H$_2$O)$_2$ [50 ppm] | 281,000 | 3,799,000 | 13.5 |
| 5 | Co(II)Salen [500 ppm] | 372,000 | 3,794,000 | 10.2 |
| 6 | K$_3$Co(CN)$_5$ [50 ppm] | 256,000 | 3,607,000 | 14.1 |

BEST MODE FOR CARRYING OUT THE INVENTION

The best mode presently contemplated for carrying out the invention is represented by the disclosure and claims herein, it being understood that selection of the best mode will depend on a variety of factors, including the monomer(s) being polymerized, the chain transfer agent and the initiator employed, and the amounts thereof, and the polymerization conditions, such as temperature, pressure, conversion and yield.

I claim:

1. In an improved free radical polymerization of monomer wherein molecular weight control is effected by means of a chain transfer agent, the improvement characterized in that the chain transfer agent is a cobalt chelate of the formula

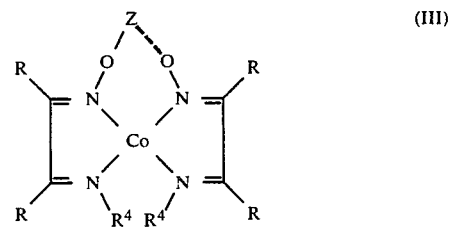

(III)

or

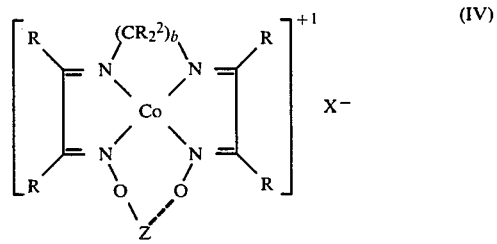

(IV)

wherein each R, independently, is phenyl or C$_1$ to C$_{12}$ alkyl wherein each α-carbon atom contains two hydrogen atoms, or R and R on adjacent carbon atoms, taken together, is C$_5$ to C$_8$ cycloalkylene, unsubstituted in the α-positions, —CH=CH—CH=CH—,

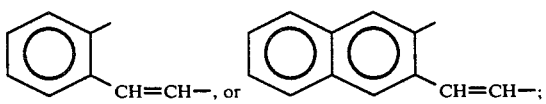

R$^2$ is H or C$_x$H$_{2x+1}$ wherein x is 1 to 12; each R$^4$, independently, is H or C$_x$H$_{2x+1}$ wherein X is 1 to 12, or both R$^4$ groups taken together is —O—Z—O—; n is 2 or 3; Z is BF$_2$, BCl$_2$, BBr$_2$ or BR$_2^2$; and X$^-$ is NO$_3^-$, Cl⁻, Br⁻, I⁻, BF₄⁻, PF₆⁻, SbF₆⁻ or R¹COO⁻ wherein R¹ is $C_1$ to $C_{12}$ alkyl.

2. In an improved free radical bulk or solution polymerization of monomer comprising contacting monomer with initiator and solvent, as necessary, in the presence of a molecular weight control agent, the improvement characterized in that the molecular weight control agent is a cobalt chelate chain transfer agent of the formula

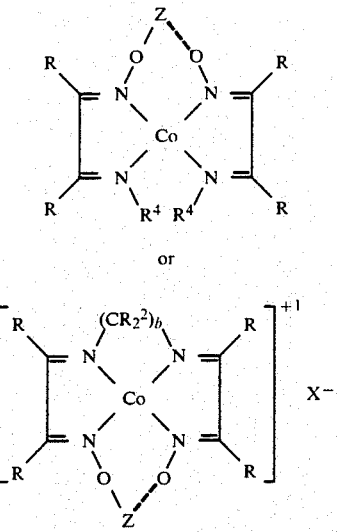

(III)

or

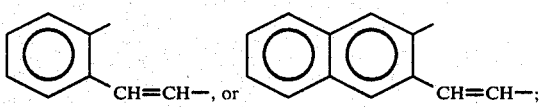

(IV)

wherein each R, independently, is phenyl or $C_1$ to $C_{12}$ alkyl wherein each α-carbon atom contains two hydrogen atoms, or R and R on adjacent carbon atoms, taken togehter, is $C_5$ to $C_8$ cycloalkylene, unsubstituted in the α-positions, —CH═CH—CH═CH—,

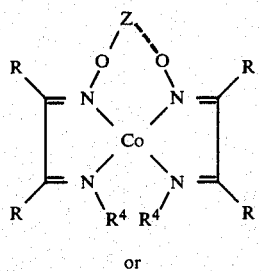

$R^2$ is H or $C_xH_{2x+1}$ wherein x is 1 to 12; each $R^4$, independently, is H or $C_xH_{2x+1}$ wherein X is 1 to 12, or both $R^4$ groups taken together is —O—Z—O—; n is 2 or 3; Z is $BF_2$, $BCl_2$, $BBr_2$ or $BR_2^2$; and X⁻ is $NO_3^-$, Cl⁻, Br⁻, I⁻, BF₄⁻, PF₆⁻, SbF₆⁻ or R¹COO⁻ wherein R¹ is $C_1$ to $C_{12}$ alkyl.

3. In an improved free radical emulsion or suspension polymerization of monomer comprising contacting monomer with initiator and suspending or emulsifying agent in the presence of a molecular weight control agent, the improvement characterized in that the molecular weight control agent is a cobalt chelate chain transfer agent of the formula

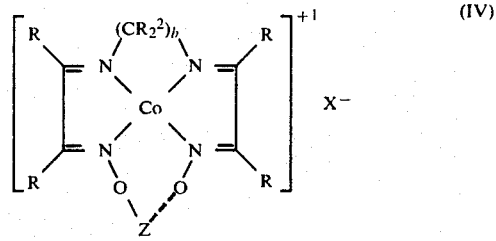

(III)

or

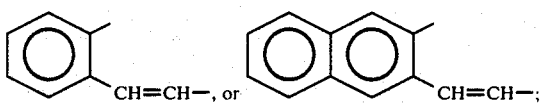

(IV)

wherein each R, independently, is phenyl or $C_1$ to $C_{12}$ alkyl wherein each α-carbon atom contains two hydrogen atoms, or R and R on adjacent carbon atoms, taken together, is $C_5$ to $C_8$ cycloalkylene, unsubstituted in the α-positions, —CH═CH—CH═CH—,

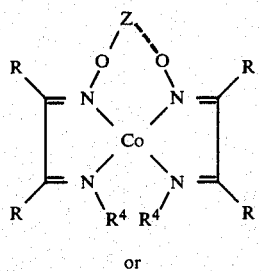

$R^2$ is H or $C_xH_{2x+1}$ wherein x is 1 to 12; each $R^4$, independently, is H or $C_xH_{2x+1}$ wherein X is 1 to 12, or both $R^4$ groups taken together is —O—Z—O—; n is 2 or 3; Z is $BF_2$, $BCl_2$, $BBr_2$ or $BR_2^2$; and X⁻ is $NO_3^-$, Cl⁻, Br⁻, I⁻, BF₄⁻, PF₆⁻, SbF₆⁻ or R¹COO⁻ wherein R¹ is $C_1$ to $C_{12}$ alkyl.

4. Process of claim 2 which is carried out at 50°–150° C.

5. Process of claim 4 which is carried out at 80°–110° C.

6. Process of claim 2 wherein an organic solvent provides a polymerization medium.

7. Process of claim 2 wherein a single monomer is homopolymerized.

8. Process of claim 2 wherein a mixture of monomers is copolymerized.

9. Process of claim 2 wherein the monomer is selected from the group consisting of methacrylate; acrylate; acrylic acid; styrene; vinyl acetate; acrylonitrile; methacrylonitrile; vinyl halides of the formula $CH_2$═CHX, wherein X is Cl or F; vinylidene halides of the formula $CH_2$═$C(X)_2$, wherein each X is, independently, Cl or F; substituted butadienes of the formula $CH_2$═C(R)C(R)═$CH_2$, wherein each R is, independently, H, $C_1$ to $C_{10}$ alkyl, Cl or F; ethylenesulfonic acid derivatives of the formula $CH_2$═$CHSO_3X$, wherein X is Na, K, Li, $N(R)_4$, H, R, or $(CH_2)_nZ$, each R is, independently, $C_1$ to $C_{10}$ alkyl, n is an integer from 1 to 10, Z is COOY, OH, $N(R)_2$, or $SO_3Y$, and Y is H, Li, Na, K or $N(R)_4$; acrylamide derivatives of the formula $CH_2$═$CHCON(R)_2$, wherein each R is, independently, H, $C_1$ to $C_{10}$ alkyl, or $(CH_2)_nZ$, n is an integer from 1 to 10, Z is COOY, OH, $N(R)_2$, or $SO_3Y$ and Y is H, Li, Na, K, or $N(R)_4$; methacrylamide derivatives of the formula $CH_2$═$C(CH_3)CON(R)_2$, wherein each R is, independently, H, $C_1$ to $C_{10}$ alkyl or $(CH_2)_nZ$, n is an integer from 1 to 10, Z is COOY, OH, $N(R)_2$, $SO_3Y$, and Y is H, Li, Na, K, or $N(R)_4$; vinyl acetates of the formula $CH_2$═CHOOCR, wherein R is $C_1$ to $C_{10}$ alkyl; and mixtures thereof.

10. Process of claim 7 wherein the monomer is a methacrylate ester.

11. Process of claim 10 wherein the monomer is selected from the group consisting cf methyl, ethyl, branched $C_1$ to $C_{12}$ alkyl, and $C_1$ to $C_{12}$ n-alkyl methacrylate esters.

12. Process of claim 10 wherein the monomer is selected from the group consisting of allyl, glycidyl, hydroxyalkyl, allyloxyethyl, 2,4-hexadienyl, and dialkylaminoalkyl methacrylate esters.

13. Process of claim 7 wherein the monomer is styrene.

14. Process of claim 7 wherein the monomer is methacrylonitrile.

15. Process of claim 8 wherein the mixture includes methyl methacrylate.

16. Process of claim 8 wherein the mixture includes styrene.

17. Process of claim 8 wherein the mixture includes methacrylonitrile.

18. Process of claim 2 wherein the cobalt chelate chain transfer agent is of formula III.

19. Process of claim 2 wherein both $R^4$ groups taken together is —O—Z—O and Z is $BF_2$.

20. Process of claim 2 wherein the cobalt chelate chain transfer agent is Co(II)(2,3-dioxyiminobutane-$BF_2$)$_2$.

21. Process of claim 2 wherein the cobalt chelate chain transfer agent is Co(II)(1,2-dioxyiminocylohexane-$BF_2$)$_2$.

22. Process of claim 2 wherein the cobalt chelate chain transfer agent is Co(II)(1,2-diphenyl-1,2-dioxyiminoethane-$BF_2$)$_2$.

23. Process of claim 2 wherein the initiator is an azo initiator.

24. Process of claim 23 wherein the initiator is selected from the group consisting of azocume, 2,2′-azobis(isobutyronitrile), 2,2′-azobis-(2-methyl)butanenitrile, 4,4′-azobis(4-cyanovaleric acid), and 2-(t-butylazo)-2-cyanopropane.

25. Process of claim 23 wherein the initiator is 2,2′-azobis(2-methyl)butanenitrile.

26. Process of claim 23 wherein the initiator is 2,2′-azobis(isobutyronitrile).

27. Process of claim 23 wherein the initiator is 4,4′-azobis(4-cyanovaleric acid).

28. Process of claim 2 wherein the initiator is a non-azo initiator.

29. Process of claim 28 wherein the initiator is selected from the group consisting of benzoyl peroxide, lauroyl peroxide, persulfates, and molecular hydrogen.

30. Process of claim 2 wherein the solvent is selected from the group consisting of aromatic hydrocarbons, ethers, alkyl esters, mixed ester-ethers, ketones, alcohols, amides, and water.

31. Process of claim 30 wherein the solvent is methanol.

32. Process of claim 30 wherein the solvent is methyl ethyl ketone.

33. Process of claim 30 wherein the solvent is dimethylformamide.

34. Process of claim 30 wherein the solvent is water.

35. Process of claim 3 which is carried out at 25°–90° C.

36. Process of claim 35 which is carried out at 65°–80° C.

37. Process of claim 3 wherein a single monomer is homopolymerized.

38. Process of claim 3 wherein a mixture of monomers is copolymerized.

39. Process of claim 3 wherein the monomer is selected from the group consisting of methacrylate; acrylate; acrylic acid; styrene; vinyl acetate; acrylonitrile; methacrylonitrile; vinyl halides of the formula $CH_2=CHX$, wherein X is Cl or F; vinylidene halides of the formula $CH_2=C(X)_2$, wherein each X is, independently, Cl or F; substituted butadienes of the formula $CH_2=C(R)C(R)=CH_2$, wherein each R is, independently, H, $C_1$ to $C_{10}$ alkyl, Cl or F; ethylenesulfonic acid derivatives of the formula $CH_2=CHSO_3X$, wherein X is Na, K, Li, N(R)$_4$, H, R, or $(CH_2)_nZ$, each R is, independently, $C_1$ to $C_{10}$ alkyl, n is an integer from 1 to 10, Z is COOY, OH, N(R)$_2$, or $SO_3Y$, and Y is H, Li, Na, K or N(R)$_4$; acrylamide derivatives of the formula $CH_2=CHCON(R)_2$, wherein each R is, independently, H, $C_1$ to $C_{10}$ alkyl, or $(CH_2)_nZ$, n is an integer from 1 to 10, Z is COOY, OH, N(R)$_2$, or $SO_3Y$ and Y is H, Li, Na, K, or N(R)$_4$; methacrylamide derivatives of the formula $CH_2=C(CH_3)CON(R)_2$, wherein each R is, independently, H, $C_1$ to $C_{10}$ alkyl or $(CH_2)_nZ$, n is an integer from 1 to 10, Z is COOY, OH, N(R)$_2$, $SO_3Y$, and Y is H, Li, Na, K, or N(R)$_4$; vinyl acetates of the formula $CH_2=CHOOCR$, wherein R is $C_1$ to $C_{10}$ alkyl; and mixtures thereof.

40. Process of claim 37 wherein the monomer is a methacrylate ester.

41. Process of claim 40 wherein the monomer is selected from the group consisting of methyl, ethyl, branched $C_1$ to $C_{12}$ alkyl, and $C_1$ to $C_{12}$ n-alkyl methacrylate esters.

42. Process of claim 40 wherein the monomer is selected from the group consisting of allyl, glycidyl, hydroxyalkyl, allyloxyethyl, 2,4-hexadienyl, and dialkylaminoalkyl methacrylate esters.

43. Process of claim 38 wherein the mixture includes a methacrylate ester.

44. Process of claim 3 wherein the cobalt chelate chain transfer agent is of formula III.

45. Process of claim 3 wherein both $R^4$ groups taken together is —O—Z—O and Z is $BF_2$.

46. Process of claim 3 wherein the cobalt chelate chain transfer agent is Co(II)(2,3-dioxyiminobutane-$BF_2$)$_2$.

47. Process of claim 3 wherein the cobalt chelate chain transfer agent is Co(II)(1,2-dioxyiminocyclohexane-$BF_2$)$_2$.

48. Process of claim 3 wherien the cobalt chelate chain transfer agent is Co(II)(1,2-diphenyl-1,2-dioxyiminoethane-$BF_2$)$_2$.

49. Process of claim 3 wherein the initiator is an azo initiator.

50. Process of claim 49 wherein the initiator is selected from the group consisting of azocumen, 2,2′-azobis(isobutyronitrile), 2,2′-azobis-(2-methyl)butanenitrile, 4,4′-azobis(4-cyanovaleric acid), and 2-(t-butylazo)-2-cyanopropane.

51. Process of claim 49 wherein the initiator is 2,2′-azobis[2-methyl]butanenitrile.

52. Process of claim 49 wherein the initiator is 4,4′-azobis(4-cyanovaleric acid).

53. Process of claim 3 wherein the initiator is a non-azo initiator.

54. Process of claim 53 wherein the initiator is selected from the group consisting of benzoyl peroxide, lauroyl peroxide, persulfates, and molecular hydrogen.

55. Process of claim 3 wherein the suspending agent is a polyacrylic acid.

56. Process of claim 3 wherein the emulsifying agent is anionic.

57. Process of claim 56 wherein the emulsifying agent is sodium dodecylsulfate.

58. Process of claim 3 wherein the emulsifying agent is cationic.

59. Process of claim 58 wherein the emulsifying agent is hexadecyltrimethylammonium bromide.

* * * * *

UNITED STATES PATENT AND TRADEMARK OFFICE
CERTIFICATE OF CORRECTION

PATENT NO. : 4,694,054

DATED : September 15, 1987

INVENTOR(S) : Andrew Henry Janowicz

It is certified that error appears in the above—identified patent and that said Letters Patent is hereby corrected as shown below:

Column 18, Claim 3, line 1, formula (IV), that portion of the formula reading "$CR_2{}^2)_b$" should read -- $(CR_2^2)_n$ --.

Column 4, line 13, "$BR_2{}^2$" should read -- $BR_2^2$ --.

Column 4, line 41, formula (II), that portion of the formula reading "$(CR_2{}^2)_n$" should read -- $(CR_2^2)_n$ --.

Column 5, line 14, formula (IV), that portion of the formula reading "$(CR_2{}^2)_b$" should read -- $(CR_2^2)_n$ --.

Claim 1, column 16, line 44, formula (IV), that portion of the formula reading "$(CR_2{}^2)_b$" should read -- $(CR_2^2)_n$ --.

Claim 1, column 16, line 68, "$BR_2{}^2$" should read -- $BR_2^2$ --.

Claim 2, column 17, line 22, formula (IV), that portion of the formula reading "$(CR_2{}^2)_b$" should read -- $(CR_2^2)_n$ --.

Claim 2, column 17, line 47, "$BR_2{}^2$" should read -- $BR_2^2$ --.

Claim 3, column 18, line 4, formula (IV), that portion of the formula reading "$(CR_2{}^2)_b$" should read -- $(CR_2^2)_n$ --.

UNITED STATES PATENT AND TRADEMARK OFFICE
CERTIFICATE OF CORRECTION

PATENT NO. : 4,694,054
DATED : September 15, 1987
INVENTOR(S) : Andrew Henry Janowicz It is certified that error appears in the above-identified patent and that said Letters Patent is hereby corrected as shown below:

Claim 3, column 18, line 28, "$BR_2{}^2$" should read -- $BR_2^2$ --.

Signed and Sealed this

Seventh Day of June, 1988

Attest:

DONALD J. QUIGG

Attesting Officer      Commissioner of Patents and Trademarks

UNITED STATES PATENT AND TRADEMARK OFFICE
CERTIFICATE OF CORRECTION

PATENT NO. : 4,694,054
DATED : September 15, 1987
INVENTOR(S) : Andrew H. Janowicz It is certified that error appears in the above-identified patent and that said Letters Patent is hereby corrected as shown below:

At Column 4, line 16 after "alkyl"; Column 5, line 28 after "alkyl"; Claim 1, Column 17, line 2 after "alkyl"; Claim 2, Column 17, line 49 after "alkyl"; and Claim 3, Column 18, line 30 after "alkyl": delete the period and add --; provided that when $R_4$ is H or $C_xH_{2x+1}$ formula III is

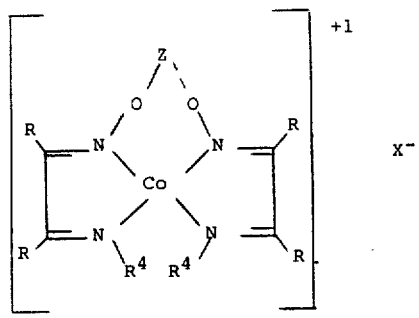

Signed and Sealed this

Twenty-first Day of August, 1990

Attest:

HARRY F. MANBECK, JR.

Attesting Officer        Commissioner of Patents and Trademarks